United States Patent
Marshall, Jr. et al.

(10) Patent No.: US 10,471,665 B1
(45) Date of Patent: Nov. 12, 2019

(54) THREE DIMENSIONAL (3D) PRINTING WITH STITCHING OF ADJACENT SUB-WALLS

(71) Applicant: Marvell International Ltd., Hamilton (BM)

(72) Inventors: Jerry A. Marshall, Jr., Corvallis, OR (US); Steven M. Goss, Corvallis, OR (US)

(73) Assignee: Marvell International Ltd., Hamilton (BM)

( * ) Notice: Subject to any disclaimer, the term of this patent is extended or adjusted under 35 U.S.C. 154(b) by 610 days.

(21) Appl. No.: 15/157,073

(22) Filed: May 17, 2016

Related U.S. Application Data

(60) Provisional application No. 62/164,325, filed on May 20, 2015.

(51) Int. Cl.
| | |
|---|---|
| *B29C 64/10* | (2017.01) |
| *B29C 64/393* | (2017.01) |
| *B29C 64/386* | (2017.01) |
| *B29C 67/00* | (2017.01) |
| *B33Y 10/00* | (2015.01) |
| *B33Y 50/02* | (2015.01) |

(Continued)

(52) U.S. Cl.
CPC .......... *B29C 67/0055* (2013.01); *B29C 64/10* (2017.08); *B29C 64/386* (2017.08); *B29C 64/393* (2017.08); *B29C 67/0088* (2013.01); *B29C 64/141* (2017.08); *B29C 64/30* (2017.08); *B33Y 10/00* (2014.12); *B33Y 50/02* (2014.12)

(58) Field of Classification Search
CPC ..... B29C 64/10; B29C 64/188; B29C 64/194; B29C 64/30; B29C 64/386; B29C 64/393; B33Y 50/00; B33Y 50/02
See application file for complete search history.

(56) References Cited

U.S. PATENT DOCUMENTS

| | | | | |
|---|---|---|---|---|
| 5,738,817 | A | * | 4/1998 | Danforth ................. B29C 41/36 264/603 |
| 6,823,230 | B1 | * | 11/2004 | Jamalabad ......... G05B 19/4099 700/119 |

(Continued)

OTHER PUBLICATIONS

Beard, Tom, "Machining from STL Files", Published Jan. 1, 1997, Accessed Apr. 4, 2019, additivemanufacturing.media (Year: 1997).*

*Primary Examiner* — Seyed Masoud Malekzadeh
*Assistant Examiner* — Sonny V Nguyen

(57) ABSTRACT

Embodiments provide a method for fabricating a three-dimensional (3D) object from a digital representation of the 3D object stored in a computer readable media, the method comprising relatively driving a nozzle with respect to a build platform, wherein the 3D object is being fabricated on the build platform and while relatively driving the nozzle with respect to the build platform, depositing, via the nozzle, printing material to fabricate a first sub-wall of the 3D object in a layer. The method further comprises while further relatively driving the nozzle with respect to the build platform, depositing, via the nozzle, printing material to fabricate a second sub-wall of the 3D object in the layer and adjacent to the first sub-wall. The second sub-wall is fabricated such that (i) the second sub-wall periodically contacts the first sub-wall and (ii) a void is periodically present between the second sub-wall and the first sub-wall.

20 Claims, 5 Drawing Sheets

(51) Int. Cl.
   *B29C 64/141*   (2017.01)
   *B29C 64/30*    (2017.01)

(56) References Cited

U.S. PATENT DOCUMENTS

| | | | | |
|---|---|---|---|---|
| 2009/0299517 | A1* | 12/2009 | Holzwarth | B33Y 50/02 |
| | | | | 700/119 |
| 2015/0093588 | A1* | 4/2015 | Sadusk | B29C 64/00 |
| | | | | 428/480 |
| 2016/0243762 | A1* | 8/2016 | Fleming | G06F 17/50 |
| 2017/0136703 | A1* | 5/2017 | Hayes | B33Y 50/00 |
| 2017/0165917 | A1* | 6/2017 | McKiel, Jr. | B29C 64/386 |
| 2017/0225445 | A1* | 8/2017 | Gardiner | B33Y 30/00 |
| 2017/0248937 | A1* | 8/2017 | Guimbretiere | G05B 19/4099 |
| 2018/0215091 | A1* | 8/2018 | Einav | B29C 64/106 |
| 2018/0264742 | A1* | 9/2018 | Yang | B29C 67/00 |

\* cited by examiner

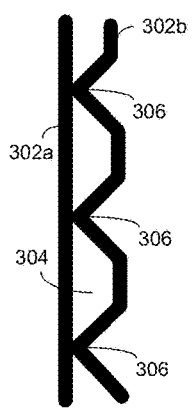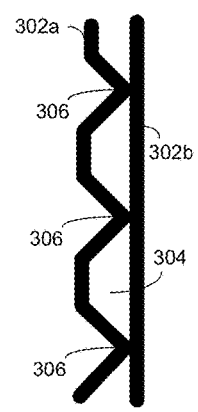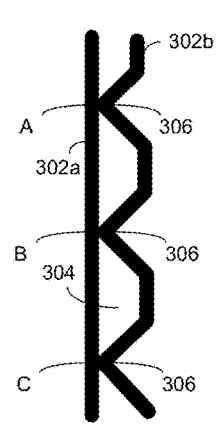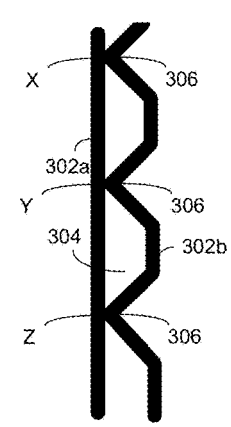
Fig. 3D
Fig. 3E

THREE DIMENSIONAL (3D) PRINTING WITH STITCHING OF ADJACENT SUB-WALLS

CROSS REFERENCE TO RELATED APPLICATIONS

This claims priority to U.S. Provisional Patent Application No. 62/164,325, filed on May 20, 2015, which is incorporated herein by reference in its entirety.

TECHNICAL FIELD

Embodiments of the present disclosure relate to three-dimensional (3D) printing, and in particular to 3D printing with stitching of adjacent sub-walls to improve the strength of walls made up of the adjacent sub-walls.

BACKGROUND

Additive manufacturing technology enables computer designs, such as computer-aided design (CAD) files, to be fabricated into three dimensional (3D) objects. Additive manufacturing, also known as 3D printing, typically comprises depositing, curing, fusing, or otherwise forming a material into sequential cross-sectional layers of the 3D object. The fabrication of a 3D object is achieved using additive processes. Thus, an object is created by laying down successive layers of material until the entire object is created. Each of these layers can be seen as a thinly sliced horizontal cross-section of the eventual object.

In a 3D printer, a nozzle deposits printing material on a build platform to fabricate 3D objects. In a conventional 3D printer, the 3D objects to be printed are described by a stereo lithography (STL) file that describes the 3D object in terms of a group of tessellated triangles in three-dimensional space. The object is prepared for printing by decomposing the STL file into a collection of two-dimensional (2D) horizontal slices with characteristic dimensions that depend upon the particular mechanism to be used to print the layers that form the 3D object. One print mechanism characteristic that is of importance in the slicing operation is the width of the material that will be deposited during the print process. When the 3D object has a wall thickness that is thin with respect to the material deposition width, the slicing operation will frequently produce printing paths that result in non-solid walls that are structurally weak and lack sufficient rigidity to support the finished 3D object.

SUMMARY

In various embodiments, the present disclosure provides a method of fabricating a three-dimensional (3D) object from a digital representation of the 3D object stored in a computer readable media. In embodiments, the method comprises relatively driving a nozzle with respect to a build platform, wherein the 3D object is being fabricated on the build platform and while relatively driving the nozzle with respect to the build platform, depositing, via the nozzle, printing material to fabricate a first sub-wall of the 3D object in a layer. The method further comprises while further relatively driving the nozzle with respect to the build platform, depositing, via the nozzle, printing material to fabricate a second sub-wall of the 3D object in the layer and adjacent to the first sub-wall. The second sub-wall is fabricated such that (i) the second sub-wall periodically contacts the first sub-wall and (ii) a void is periodically present between the second sub-wall and the first sub-wall.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Various embodiments are illustrated by way of example and not by way of limitation in the figures of the accompanying drawings.

FIGS. 3A-3E illustrate examples a wall of a 3D object comprising various sub-walls.

DETAILED DESCRIPTION

Figure 1:
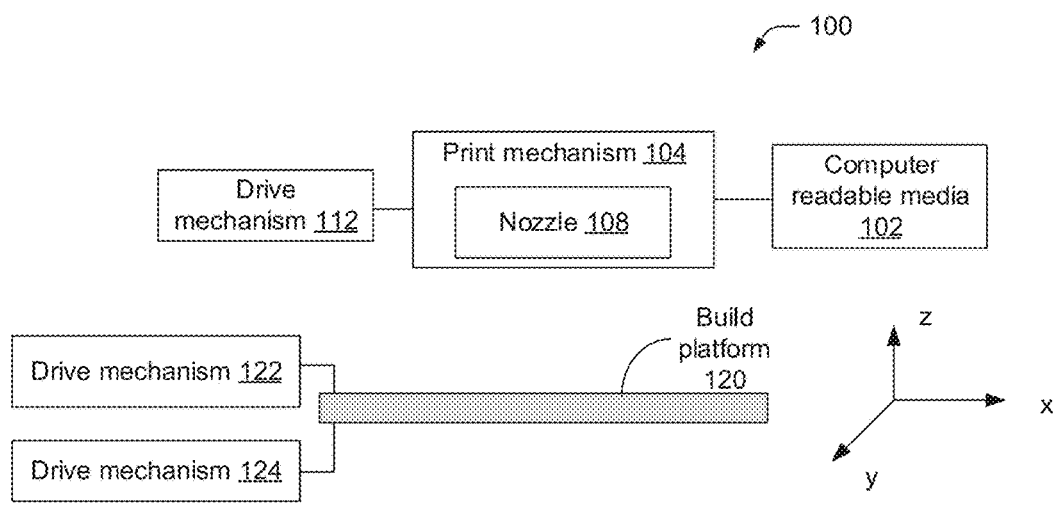
FIG. 1 schematically illustrates a system for fabricating a 3D object from a digital representation of the object stored in a computer readable media.

FIG. 1 schematically illustrates a three-dimensional (3D) printer 100 for fabricating a 3D object from a digital representation of the object stored in a computer readable media 102. The computer readable media 102 may located within the 3d printer 100 or may be external to the 3D printer 100. The computer readable media 102 may include, but is not limited to, random access memory (RAM), read-only memory (ROM), electrically erasable programmable read-only memory (EEPROM), flash memory or other memory technology, compact disc ROM (CD-ROM), digital versatile disks (DVD) or other optical storage, magnetic cassettes, magnetic tape, magnetic disk storage or other magnetic storage devices, or any other non-transitory computer readable medium that can be used to store information and which can be accessed by a processor. The 3D printer 100 comprises (i) a print mechanism 104 and (ii) a build platform 120 that is configured to selectively rotate while one or more layers of the 3D object is being fabricated on the build platform 120. FIG. 1 schematically illustrates a side view of the build platform 120. Thus, the 3D printer 100 generally comprises, for example, a 3D printing system configured to fabricate 3D objects as is generally known in the art.

The print mechanism 104 (or at least one or more components of the print mechanism 104) is disposed above the build platform 120. In an embodiment, the print mechanism 104 comprises a nozzle 108. Although FIG. 1 illustrates only one nozzle 108, in another embodiment, more than one nozzle can be included in the print mechanism 104. The nozzle 108 is configured to selectively deposit printing material on the build platform 120, to fabricate the 3D object.

Figure 2:
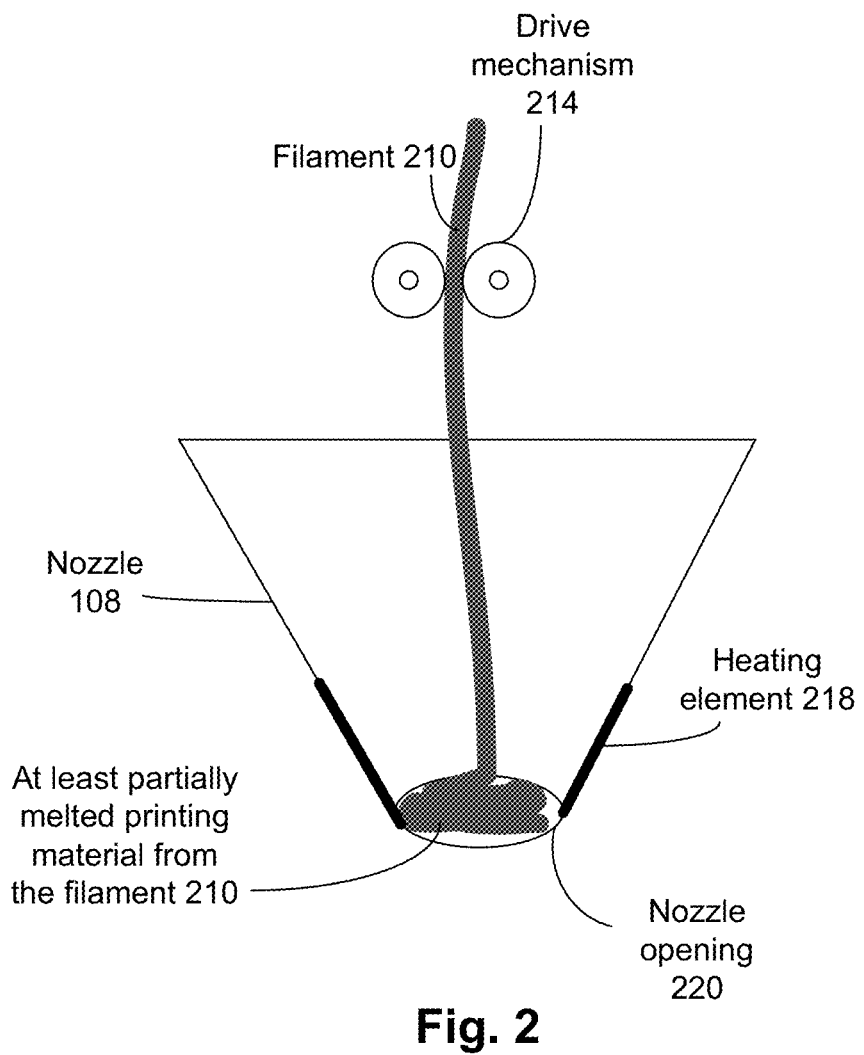
FIG. 2 schematically illustrates an example implementation of a nozzle of the system of FIG. 1.

For example, the nozzle 108 receives a filament (illustrated in FIG. 2). A filament is, for example, a tubular or wire-like strip of printing material that is eventually deposited by the nozzle 108 while fabricating the 3D object. A filament comprises any appropriate material used for 3D printing, e.g., polymers, plastic, nylon, etc. For example, the nozzle 108 receives the filament, heats the filament (e.g., using a heating element included in the nozzle 108, or surrounding the nozzle 108, as a result of which the filament at least partially melts), and deposits the at least partially melted printing material of the filament through an opening of the nozzle 108, while fabricating the 3D object.

The 3D printer 100 further comprises the build platform 120, on which the 3D object is fabricated, e.g., based on the nozzle 108 depositing the printing material on the build platform 120. As an example, the build platform 120 comprises a build table or a build plate, on which the 3D object is to be fabricated.

FIG. 1 illustrates the X axis, Y axis and Z axis. The X and Y axis are horizontal axis, e.g., are on a plane of the build platform 120 (e.g., assuming that the build platform 120 is also horizontal). The Z axis is the vertical axis, e.g., perpendicular to the plane of the build platform 120. For ease of discussion, directions associated with the X, Y and Z axes are respectively referred to as the x, y and z directions.

In an embodiment, the 3D printer 100 further comprises a drive mechanism 112 configured to drive the nozzle 108, while the nozzle 108 is depositing printing material on the build platform 120 while fabricating the 3D object. In an embodiment, the drive mechanism 112 is configured to drive the nozzle 108 in the x and y directions (that is, in the x-y plane). That is, the drive mechanism 112 is configured to drive the nozzle 108 horizontally over the build platform 120.

In an embodiment, the 3D printer 100 further comprises one or both of drive mechanisms 122 and 124 configured to drive the build platform 120, while the nozzle 108 is depositing printing material on the build platform 120 while fabricating the 3D object. In an embodiment, the drive mechanism 122 is configured to drive the build platform 120 in the z direction. That is, the drive mechanism 122 is configured to drive the build platform 120 vertically.

For example, while the nozzle 108 fabricates a first layer of the 3D object, the nozzle 108 is moved in the horizontal plane over the build platform 120 by the drive mechanism 112. Once the nozzle 108 fabricates the first horizontal layer of the 3D object and is to fabricate a second layer of the 3D object (where, for example, the first layer is at a first horizontal plane, while the second layer is at a second horizontal plane), the drive mechanism 122 adjusts the build platform 120 in the z direction (i.e., adjusts the height of the build platform 120), and then the nozzle 108 fabricates the second layer of the 3D object. The driving of the build platform 120 by the drive mechanism 122 and the driving of the nozzle 108 by the drive mechanism 112 may be continuous and/or overlapping, based on the structure of the 3D object that is being fabricated.

FIG. 1 illustrates the drive mechanism 122 driving the build platform 120 (e.g., driving the build platform 120 in the vertical direction, while the nozzle 108 is being driven in the horizontal plane). However, although not illustrated in FIG. 1, in another embodiment, the drive mechanism 122 may instead drive the nozzle 108 in the vertical direction. In such an embodiment, the nozzle 108 is being driven in the horizontal plane by the drive mechanism 112, and the nozzle 108 is being driven in the vertical direction by the drive mechanism 122 (e.g., while there is no vertical or horizontal movement of the build platform 120).

In an embodiment, the 3D printer 100 further comprises the drive mechanism 124, which is configured to provide one or both of a linear motion and a rotational motion to the build platform 120. For example, the drive mechanism 124 rotates the build platform 120 in the x-y plane (i.e., horizontally rotates the build platform 120) and/or moves the build platform 120 linearly in the x-y plane (i.e., horizontally moves the build platform 120 in straight lines). Rotation of the build platform 120 is used, for example, while rounded or circular layers of the 3D object are being fabricated. Thus, the various drive mechanisms 112, 122 and/or 124 drive the nozzle 108 and the build platform 120 relative to each other. In an embodiment, the nozzle 108 and the build platform 120 are driven relative to each other at a constant speed, at least while the nozzle 108 is depositing printing material.

FIG. 2 schematically illustrates an example implementation of the nozzle 108 of FIG. 1. In the example implementation of FIG. 2, the nozzle 108 receives a filament 210. As previously noted, a filament is, for example, a tubular or wire-like strip of printing material that is eventually deposited by a nozzle while fabricating a 3D object. The filament 210 comprises any appropriate material used for 3D printing, e.g., polymers, plastic, nylon, etc.

In an embodiment, the nozzle 108 comprises heating element 218 configured to heat the filament 210 as the filament 210 is driven through the nozzle 108. Although the heating element 218 is illustrated in FIG. 2 to be mounted on sidewalls of a lower part of the nozzle 108, in another embodiment, the heating element 218 can have any different shape, size, configuration and/or position. In an embodiment, the heating element 218 can be external to the nozzle 108 (e.g., placed proximally to the nozzle 108).

In an embodiment, the nozzle 108 receives the filament 210, and the filament 210 is heated using the heating element 218 (or using any other appropriate heating arrangement not illustrated in FIG. 2). As a result, the filament 210 at least partially melts. The nozzle 108 has an opening 220 on one end. The at least partially melted filament 210 is deposited through the opening 220 of the nozzle 108, while the 3D object is being fabricated on the build platform 120.

In an embodiment, the filament 210 is driven through the nozzle 108, while the nozzle 108 deposits printing material over the build platform 120 to fabricate the 3D object. For example, the 3D printer 100 comprises drive mechanism 214 to drive the filament 210 through the nozzle 108. The example of FIG. 2 illustrates the drive mechanism 214 comprising two rollers, although the drive mechanism 214 can include one or more other appropriate components (e.g., comprising motors, gears, cams, clutches, etc.) to drive the filament 210 through the opening 220 of the nozzle 108.

FIG. 2 illustrates an example configuration and position of the drive mechanism 214, although the drive mechanism 214 can have any other configuration, shape, size, etc., and can be placed at any other location relative to the nozzle 108.

Although FIG. 2 illustrates a single filament 210 being driven through the nozzle 108, in another embodiment (and not illustrated in FIG. 2), more than one filaments can be received at the nozzle 108, and one of the multiple filaments can be selected and driven through the opening 220.

In an embodiment, the opening 220 is, for example, circular. For example, the opening 220 is manufactured to have a circular shape and a specific size.

Figure 3A:
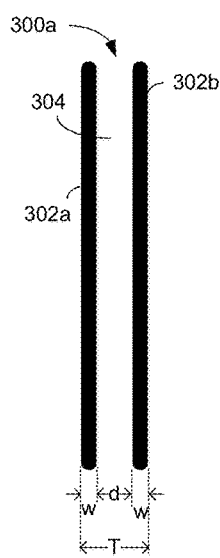

FIG. 3A schematically illustrates an example of a wall 300a fabricated by a nozzle (e.g. nozzle 108) of a 3D printer (e.g. 3D printer 100), wherein the wall thickness T is relatively thin and not a multiple with respect to a width W of material deposition from the nozzle. For example, assuming the wall 300a has a thickness T of 1.0 millimeters (mm) and the nozzle has a width for material deposition of 0.4 mm, the 3D printer will move the nozzle to fabricate a first sub-wall 302a having a width of 0.4 mm and will then move the nozzle to fabricate a second sub-wall 302b, also having a width of 0.4 mm, to form the wall 300a. In order to achieve the overall wall thickness of 1.0 mm, a void 304 having a width of D (in this example 0.2 mm) is defined between the first sub-wall 302a and the second sub-wall 302b since the nozzle cannot deposit more printing material between the two sub-walls 302a, 302b and maintain the thickness T of 1.0 mm. Thus, the final resulting wall 300*a* may have structural weaknesses due to the presence of the void 304 between the first sub-wall 302*a* and the second sub-wall 302*b*.

Figure 3B:
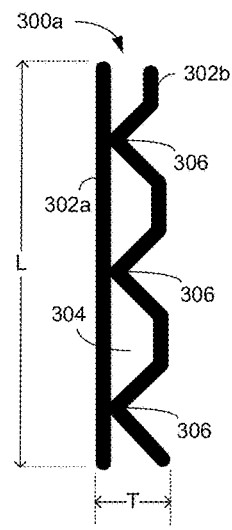

In accordance with embodiments, the slicing operation of STL files into 2D slices is enhanced to determine object walls of 3D objects to be printed are thin (where thin is less than a threshold, for example, the thickness of the object wall is not a multiple of a width of material deposition of the nozzle) and modify the material deposition path for internal (and presumably less visible) sub-walls that make up object walls in order to stitch sub-walls together at intervals to create object walls. The material deposition path is altered such that the path follows a sub-wall boundary but periodically moves close enough to an adjacent sub-wall such that the two sub-walls are bonded together and then returns to the original path as shown in FIG. 3B Thus, referring to FIG. 3B, in accordance with embodiments, the second sub-wall 302*b* can be fabricated such that the second sub-wall 302*b* periodically contacts the first sub-wall 302*a*. The second sub-wall 302*b* may contact the first sub-wall 302*a* at various points of contact 306 based upon a fraction. The fraction may be arbitrary and an appropriate choice may be based on the length L of the wall, e.g., one-half a length L of the wall for shorter walls to 1/32 (or smaller) a length L of the wall for longer walls. In other embodiments, the points of contact 306 for the second sub-wall 302*b* may be at predetermined distances. For example, the points of contact 306 may be spaced such that the second sub-wall 302*b* contacts the first sub-wall 302*a* spaced apart at predetermined intervals related to the width W of material deposition from the nozzle (illustrated in FIG. 3A). For example, a minimum practical spacing may be approximately three times W (3*W) while a maximum value is generally dependent on the material being deposited and a desired increase in wall stiffness. A useful example value for the maximum spacing is approximately 20*W. Other fractional relationships and predetermined distance intervals may be used as desired. Additionally, the location of points of contact 306 may occur at random intervals, i.e. the point of contact 306 may be spaced apart by varying intervals.

Figure 3C:
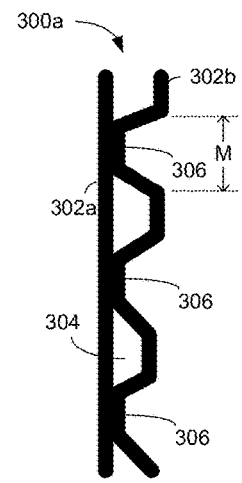

Referring to FIG. 3C, in embodiments, the points of contact 306 may be configured such that the points of contact 306 have a length M that is related to the width W of material deposition from the nozzle (illustrated in FIG. 3A). An example range of values includes approximately 1*W to 5*W. Other lengths for the points of contact 306 may be used if desired. Also, the points of contact 306 may have different lengths M with respect to one another.

In accordance with various embodiments, the sub-walls 302*a*, 302*b* may switch as to which sub-wall contacts the other sub-wall. For example, referring to FIG. 3D, in a first layer the second sub-wall 302*b* may be fabricated such that the second sub-wall 302*b* periodically contacts the first sub-wall 302*a*. In a second layer located on the first layer, the first sub-wall 302*a* may be fabricated such that the first sub-wall 302*a* periodically contacts the second sub-wall 302*b*. In other words, different layers may have a different sub-wall contacting an adjacent sub-wall, i.e., in one layer, the first sub-wall 302*a* will be a straight line and the second sub-wall 302*b* will "zig-zag" to contact the first sub-wall 302*a*, while in another layer the second sub-wall 302*b* will be fabricated such that the second sub-wall 302*b* is straight and the first sub-wall 302*a* zig-zags, as can be seen in FIG. 3D. In such embodiments, the switching of the straight sub-walls and the zig-zag sub-walls may occur every other layer, every third layer, every fourth layer, etc., as desired.

In accordance with embodiments, as can be seen in FIG. 3E, the points of contact 306 between the sub-walls 302*a*, 302*b* may be offset with respect to each other. For example, in a first layer, the points of contact 306 may be at points A, B and C. In a second layer on the first layer, the points of contact 306 may be offset with respect to the first layer at X, Y and Z. The pattern can alternatingly repeat among layers, e.g., first, third, fifth, etc., layers may have sub-walls 302 with points of contact at A, B and C, while the second, fourth, sixth, etc., layers may have sub-walls 302 with points of contact at X, Y and Z. Alternatively, the various sub-walls 302 may have offset points of contact 306 within multiple layers, e.g., layers one through five may have points of contact 306 that are offset with respect to each other in all five layers in a random fashion.

Accordingly, fabricating object walls of a 3D object being printed in accordance with the techniques described herein results in dimensional accuracy being preserved while increasing the strength and rigidity of thin walls by providing internal attachment points between the sub-walls. Wall strength versus visible printing artefacts can be traded off by varying the material deposition path as shown in FIGS. 3C-3E. Further reduction in apparent visible ripple in a wall surface can be achieved by randomizing the stitching intervals. More particularly, reducing the visible ripple in the walls may be accomplished by randomizing the stitching intervals and/or randomly switching between applying the stitching to the internal or external sub-walls. In addition, the stitching pattern may be applied to both inner and outer sub-walls on the same layer, provided that the contact points of the outer sub-wall do not align with the contact points of the inner sub-wall.

Figure 4:
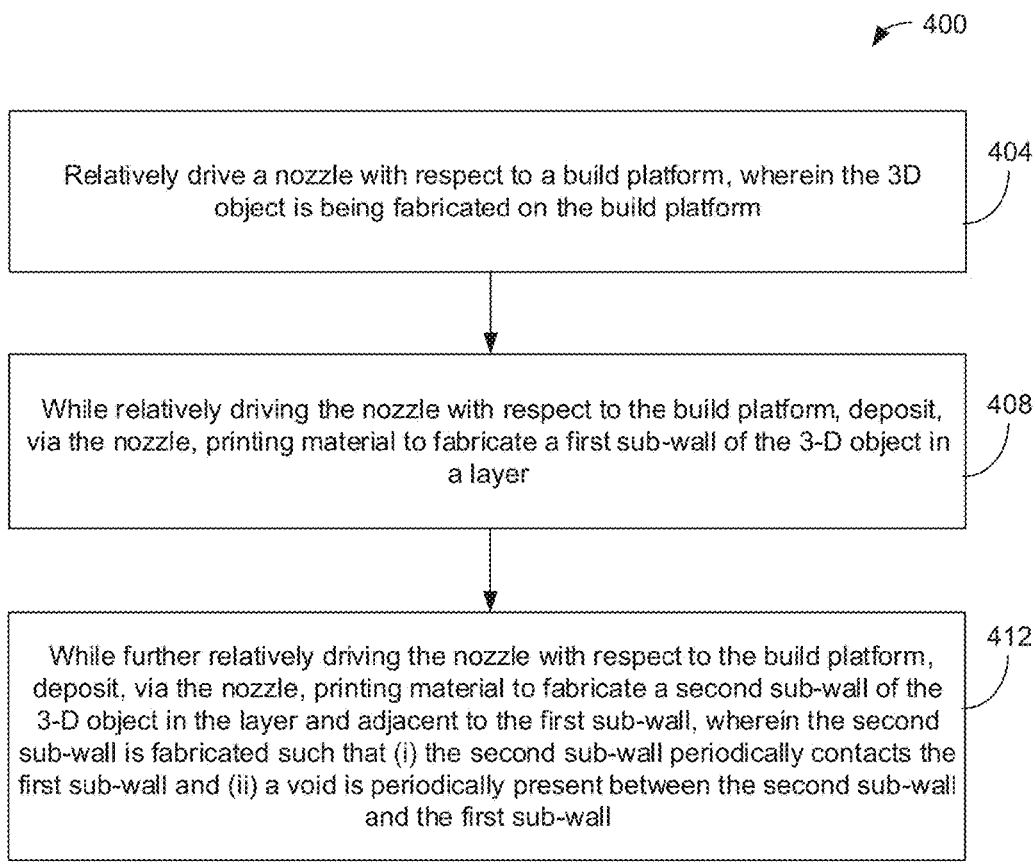
FIG. 4 is a flow diagram of an example method for fabricating a 3D object.

FIG. 4 is a flow diagram of an example method 400 for fabricating a 3D object. The method 400 is implemented, for example, using the 3D printer 100 of FIGS. 1 and 2 (or a similar 3D printing system).

At 404, a nozzle (e.g., nozzle 108 of the 3D printer 100) is relatively driven with respect to a build platform (e.g., build platform 120 of the 3D printer 100), where the 3D object is being fabricated on the build platform. At 408, while relatively driving the nozzle with respect to the build platform, the nozzle deposits printing material to fabricate a first sub-wall of the 3-D object in a layer. At 412, while further relatively driving the nozzle with respect the build platform, the nozzle deposits printing material to fabricate a second sub-wall of the 3-D object in the layer and adjacent to the first sub-wall, wherein the second sub-wall is fabricated such that (i) the second sub-wall periodically contacts the first sub-wall and (ii) a void is periodically present between the second sub-wall and the first sub-wall.

The description may use the phrases "in an embodiment," or "in embodiments," which may each refer to one or more of the same or different embodiments. The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B." The phrase "at least one of A, B and C" means (A), (B), (C), (A and B), (A and C), (B and C) or (A, B and C). The phrase "(A) B" means (B) or (A and B), that is, A is optional.

Although certain embodiments have been illustrated and described herein, a wide variety of alternate and/or equivalent embodiments or implementations calculated to achieve the same purposes may be substituted for the embodiments illustrated and described without departing from the scope of the present invention. This application is intended to cover any adaptations or variations of the embodiments discussed herein. Therefore, it is manifestly intended that embodiments in accordance with the present invention be limited only by the claims and the equivalents thereof.

What is claimed is:

1. A method of fabricating a three-dimensional (3D) object from a digital representation that describes the 3D object in three-dimensional space stored in a computer readable medium, the method comprising:
    decomposing the digital representation that describes the 3D object in three-dimensional space into two-dimensional slices;
    determining from the two-dimensional slices that a thickness of at least one wall of the 3D object is less than a threshold with respect to a width of material deposition of a nozzle;
    modifying a material deposition path for the at least one wall of the 3D object, the at least one wall of the 3D object comprising a first sub-wall and a second sub-wall;
    relatively driving the nozzle with respect to a build platform, wherein the 3D object is being fabricated on the build platform;
    depositing, via the nozzle, printing material to fabricate the first sub-wall of the 3D object in a first layer; and
    depositing, via the nozzle, printing material to fabricate the second sub-wall of the 3D object in the first layer and adjacent to the first sub-wall according to the modified material deposition path, wherein the second sub-wall is fabricated such that (i) the second sub-wall periodically contacts the first sub-wall, (ii) a void is periodically present between the second sub-wall and the first sub-wall, and (iii) an outer surface of the first sub-wall and an outer surface of the second sub-wall define the thickness of the at least one wall of the 3D object.

2. The method of claim 1, wherein the threshold is defined as a multiple of the width of material deposition of the nozzle.

3. The method of claim 1, wherein the second sub-wall periodically contacts the first sub-wall at a predetermined distance interval along a length of the at least one wall comprising the first sub-wall and the second sub-wall.

4. The method of claim 1, wherein the second sub-wall periodically contacts the first sub-wall periodically based upon a fraction of a length of the at least one wall comprising the first sub-wall and the second sub-wall.

5. The method of claim 1, wherein relatively driving the nozzle with respect to the build platform comprises driving the build platform.

6. The method of claim 1, wherein the second sub-wall periodically contacts the first sub-wall at random locations along a length of the at least one wall comprising the first sub-wall and the second sub-wall.

7. The method of claim 1, wherein the method further comprises:
    depositing, via the nozzle, printing material to fabricate a first sub-wall of a second layer being a third sub-wall of the 3D object; and
    depositing, via the nozzle, printing material to fabricate a second sub-wall of the second layer being a fourth sub-wall of the 3D object and adjacent to the third sub-wall, wherein the third sub-wall is deposited on the first sub-wall and the fourth sub-wall is deposited on the second sub-wall, and wherein one of the third sub-wall or the fourth sub-wall is fabricated such that (i) one of the third sub-wall or the fourth sub-wall periodically contacts the other of the fourth sub-wall or the third sub-wall according to the modified material deposition path and (ii) a void is periodically present between the third sub-wall and the fourth sub-wall.

8. The method of claim 7, wherein the fourth sub-wall is fabricated such that the fourth sub-wall periodically contacts the third sub-wall.

9. The method of claim 7, wherein the third sub-wall is fabricated such that the third sub-wall periodically contacts the fourth sub-wall.

10. The method of claim 7, wherein:
    the second sub-wall periodically contacts the first sub-wall at a predetermined distance interval along a length of the at least one wall comprising the first sub-wall and the second sub-wall; and
    the fourth sub-wall periodically contacts the third sub-wall at a second predetermined distance interval along the length of the at least one wall comprising the first sub-wall and the second sub-wall.

11. The method of claim 7, wherein:
    the second sub-wall periodically contacts the first sub-wall at a predetermined distance interval along a length of the at least one wall comprising the first sub-wall and the second sub-wall; and
    the third sub-wall periodically contacts the fourth sub-wall at a second predetermined distance interval along the length of the at least one wall comprising the first sub-wall and the second sub-wall.

12. The method of claim 7, wherein the second layer randomly switches the third sub-wall and the fourth sub-wall with the modified material deposition path.

13. The method of claim 1, wherein the method further comprises:
    depositing, via the nozzle, printing material to fabricate a first sub-wall of a second layer being a third sub-wall of the 3D object; and
    depositing, via the nozzle, printing material to fabricate a second sub-wall of the second layer being a fourth sub-wall of the 3D object and adjacent to the third sub-wall, wherein the third sub-wall is deposited on the first sub-wall and the fourth sub-wall is deposited on the second sub-wall, wherein the fourth sub-wall is fabricated such that (i) the fourth sub-wall periodically contacts the third sub-wall and (ii) a void is periodically present between the third sub-wall and the fourth sub-wall, and wherein the fourth sub-wall is fabricated such that it contacts the third sub-wall at first locations that are offset with respect to second locations where the second sub-wall contacts the first sub-wall.

14. The method of claim 1, wherein the second sub-wall is further fabricated such that widths of points of contact where the second sub-wall periodically contacts the first sub-wall are related to the width of material deposition of the nozzle.

15. The method of claim 14, wherein widths of the points of contact where the second sub-wall periodically contacts the first sub-wall are more than one value.

16. A method of fabricating a three-dimensional (3D) object from a stereo lithography (STL) file representation of the 3D object stored in a computer readable medium, the method comprising:
    decomposing the STL file into two dimensional slices;
    based upon decomposing the STL file into two-dimensional (2D) slices, determining that a thickness of one or more walls comprising sub-walls of the 3D object are less than a threshold with respect to a width of material deposition of a nozzle;

modifying a material deposition path for at least one wall of the 3D object, the at least one wall of the 3D object comprising a first sub-wall and a second sub-wall;

relatively driving the nozzle with respect to a build platform, wherein the 3D object is being fabricated on the build platform;

depositing, via the nozzle, printing material to fabricate the first sub-wall in a first layer;

depositing, via the nozzle, printing material to fabricate the second sub-wall in the first layer and adjacent to the first sub-wall according to the modified material deposition path, wherein the second sub-wall is fabricated such that (i) the second sub-wall periodically contacts the first sub-wall, (ii) a void is periodically present between the second sub-wall and the first sub-wall, and (iii) an outer surface of the first sub-wall and an outer surface of the second sub-wall define the thickness of the at least one wall of the 3D object;

depositing, via the nozzle, printing material to fabricate a first sub-wall of a second layer being a third sub-wall of the 3D object; and depositing, via the nozzle, printing material to fabricate a second sub-wall of the second layer being a fourth sub-wall of the 3D object and adjacent to the third sub-wall, wherein:

the third sub-wall is deposited on the first sub-wall and the fourth sub-wall is deposited on the second sub-wall, and one of the third sub-wall or the fourth sub-wall is fabricated such that (i) one of the third sub-wall or the fourth sub-wall periodically contacts the other of the fourth sub-wall or the third sub-wall and (ii) a void is periodically present between the third sub-wall and the fourth sub-wall.

17. The method of claim 16, wherein the third sub-wall is fabricated such that the third sub-wall periodically contacts the fourth sub-wall.

18. The method of claim 16, wherein the fourth sub-wall is fabricated such that the fourth sub-wall periodically contacts the third sub-wall.

19. The method of claim 18, wherein the fourth sub-wall is fabricated such that it contacts the third sub-wall at first locations that are offset with respect to second locations where the second sub-wall contacts the first sub-wall.

20. A three-dimensional (3D) printer for fabricating a 3D object, the 3D printer configured to:

receive a digital representation that describes the 3D object in three-dimensional space;

decompose the digital representation that describes the 3D object in three-dimensional space into two-dimensional slices;

determine from the two-dimensional slices that a thickness of at least one wall of the 3D object is less than a threshold with respect to a width of material deposition of a nozzle associated with the 3D printer;

modify a material deposition path for the at least one wall of the 3D object, the at least one wall of the 3D object comprising a first sub-wall and a second sub-wall;

drive, to fabricate the at least one wall of the 3D object, the nozzle with respect to a build platform of the 3D printer on which the 3D object is to be fabricated;

deposit, via the nozzle, printing material to fabricate the first sub-wall of the 3D object in a layer; and deposit, via the nozzle, printing material to fabricate the second sub-wall of the 3D object in the layer and adjacent to the first sub-wall according to the modified material deposition path, the first sub-wall and the second sub-wall in the layer configured to create the thickness of the at least one wall of the 3D object that is less than the threshold, wherein the second sub-wall is fabricated such that (i) the second sub-wall periodically contacts the first sub-wall, (ii) a void is periodically present between the second sub-wall and the first sub-wall, and (iii) an outer surface of the first sub-wall and an outer surface of the second sub-wall define the thickness of the at least one wall of the 3D object.

* * * * *